United States Patent
Couturier et al.

(10) Patent No.: US 8,911,200 B2
(45) Date of Patent: Dec. 16, 2014

(54) ASSEMBLING TITANIUM AND STEEL PARTS BY DIFFUSION WELDING

(75) Inventors: Raphael Couturier, Sassenage (FR); Jean-Pierre Ferte, Corbeil Essonnes (FR); Olivier Gillia, Sassenage (FR); Xavier Firmin Camille Jean Lescure, Boulogne Billancourt (FR); Bruno Riccetti, Sassenage (FR)

(73) Assignee: Snecma, Paris (FR)

( * ) Notice: Subject to any disclaimer, the term of this patent is extended or adjusted under 35 U.S.C. 154(b) by 898 days.

(21) Appl. No.: 13/120,443

(22) PCT Filed: Sep. 21, 2009

(86) PCT No.: PCT/EP2009/062223
§ 371 (c)(1),
(2), (4) Date: Mar. 23, 2011

(87) PCT Pub. No.: WO2010/034697
PCT Pub. Date: Apr. 1, 2010

(65) Prior Publication Data
US 2011/0176911 A1    Jul. 21, 2011

(30) Foreign Application Priority Data
Sep. 24, 2008 (FR) .................... 08 05249

(51) Int. Cl.
| F04D 29/04 | (2006.01) |
| B23K 20/02 | (2006.01) |
| B23K 35/00 | (2006.01) |
| F01D 5/02 | (2006.01) |

(52) U.S. Cl.
CPC .......... *B23K 20/02* (2013.01); *B23K 20/021* (2013.01); *B23K 20/028* (2013.01); *B23K 35/002* (2013.01); *B23K 35/004* (2013.01); *F01D 5/026* (2013.01); *B23K 2201/001* (2013.01); *Y02T 50/67* (2013.01); *Y02T 50/672* (2013.01); *F05D 2230/236* (2013.01); *F05D 2300/133* (2013.01)

USPC ............................................ 415/1; 415/216.1

(58) Field of Classification Search
USPC .................................................. 415/216.1, 1
See application file for complete search history.

(56) References Cited

U.S. PATENT DOCUMENTS 2,985,955 A * 5/1961 Rostoker et al. ............. 228/175
3,535,767 A * 10/1970 Doherty, Jr. et al. ......... 228/107

(Continued)

FOREIGN PATENT DOCUMENTS

| GB | 2 220 595 | 1/1990 |
| JP | 57 152386 | 9/1982 |
| JP | 7 232284 | 9/1995 |

OTHER PUBLICATIONS

American Welding Society, Welding Handbook Fundamentals of Welding, Pub. 1968, Edited by Arthur L. Phillips, 6th ed., Section 1, p. 5.23-5.37.*

(Continued)

*Primary Examiner* — Edward Look
*Assistant Examiner* — Aaron R Eastman
(74) *Attorney, Agent, or Firm* — Oblon, Spivak, McClelland, Maier & Neustadt, L.L.P.

(57) ABSTRACT

A method of assembling together titanium parts and steel parts by diffusion welding, the method interposing two thin layers of niobium or vanadium and copper respectively between a titanium part and a steel part, evacuating the assembly of parts and interposed metal layers, and subjecting the assembly to hot isostatic compression at a temperature lying in a range 900° C. to 950° C. and at a pressure lying in a range 1000 bars to 1500 bars for about two hours. The method can be applied to fabricating turbine shafts for turbomachines.

12 Claims, 2 Drawing Sheets

(56) References Cited

U.S. PATENT DOCUMENTS

| | | | |
|---|---|---|---|
| 4,566,625 A * | 1/1986 | Moe | 228/265 |
| 5,338,072 A * | 8/1994 | Bitter et al. | 285/288.1 |
| 5,937,708 A * | 8/1999 | Ito et al. | 464/179 |
| 6,971,850 B2 * | 12/2005 | Ganesh et al. | 415/216.1 |
| 7,331,757 B2 * | 2/2008 | Janssen et al. | 415/200 |
| 2002/0081197 A1 * | 6/2002 | Crawmer | 415/216.1 |
| 2002/0192021 A1 * | 12/2002 | Wilson et al. | 403/359.6 |
| 2004/0013521 A1 * | 1/2004 | Yamada | 415/216.1 |
| 2005/0199384 A1 * | 9/2005 | Mack et al. | 166/105 |

OTHER PUBLICATIONS

American Welding Society, Welding Handbook Welding, Cutting and Related Processes, Pub. 1971, Edited by Len Griffing, 6th ed., Section 3B, p. 52.4-52.30.*

International Search Report Issued Nov. 16, 2009 in PCT/EP09/062223 filed Sep. 21, 2009.

* cited by examiner

ASSEMBLING TITANIUM AND STEEL PARTS BY DIFFUSION WELDING

BACKGROUND OF THE INVENTION

1. Field of the Invention

The invention relates to a method of assembling together parts of different natures by diffusion welding, one of the parts being made of titanium and the other of steel, and it also relates to metal parts obtained by the method, in particular turbine shafts for turbomachines.

2. Description of the Related Art

In the context of research seeking to reduce the noise, the fuel consumption, and the $CO_2$ emissions of airplane engines, the torque transmitted by the low-pressure turbine shaft of a turbomachine has been increased very significantly, but without changing the diameter and the weight of the shaft, thereby leading the Applicant to investigate making a shaft having a central portion of composite material with a titanium matrix and including end pieces made of high-strength steel, which end pieces can be machined to have shapes that are relatively complex for connection to other components of the turbomachine.

Assembling together the titanium central portion with the steel endpieces raises problems that have so far not yet been solved in satisfactory manner, particularly since the titanium-steel junctions need to present very strong mechanical characteristics for turbine shafts.

BRIEF SUMMARY OF THE INVENTION

To this end, the invention provides a method of assembling together titanium parts and steel parts by diffusion welding, the method being characterized in that it consists in:

interposing two thin metal layers between a titanium part and a steel part, the two metal layers comprising a thin layer or foil of niobium or vanadium (beside the titanium) and a thin layer or foil of copper (beside the steel);

putting the assembly comprising the two parts and the two interposed metal layers under a vacuum; and subjecting said assembly to hot isostatic compression at a temperature lying in the range 900° C. to 950° C., and at a pressure lying in the range 1000 bars to 1500 bars, the hot isostatic compression being followed by controlled cooling.

Subjecting the assembly formed by the titanium part, the interposed metal layers, and the steel part to hot isostatic compression serves to assemble together the titanium part and the steel part by diffusing welding, the interposed metal layers preventing titanium migrating into the steel and preventing iron from migrating into the titanium, since that would give rise to intermetallic phases weakening the junction between the two parts.

In general, hot isostatic compression consists in making a stack of elements, and in sealing the periphery of said elements, generally by welding, while leaving an orifice leading to the interfaces for degassing purposes. After degassing, performed by pumping out through the orifice, the orifice is closed in leaktight manner, in general by welding. The stack is then subjected to a high pressure of a gas (generally argon) at a high temperature for a given duration. Hot isostatic compression eliminates clearances between the elements and achieves solid-state welding between the elements.

In the present invention, the duration of the hot isostatic compression lies in the range one hour to three hours, approximately. It is about two hours in a particular implementation of the invention, as described below.

According to another characteristic of the invention, the method consists in subjecting the assembly to heat treatment including a first dwell at about 800° C., followed by cooling, a second dwell at about 450° C., and cooling.

The above-mentioned assembly is maintained at a pressure lying in the range 1000 bars to 1500 bars, approximately, during the heat treatment.

The interposed metal layers are of small thickness, lying in the range 20 micrometers (µm) to 50 µm, approximately, and they may be formed by stamping foils or by depositing metal on the ends of the parts that are to be assembled together.

According to yet another characteristic of the invention, the method consists in machining the ends of the parts for assembling together in order to give them non-plane complementary shapes, the end of the steel part including at least one projecting portion engaged in an indentation in the titanium part.

These shapes take advantage of the thermal expansion difference between titanium and steel during hot isostatic compression to guarantee that contact is maintained between the two parts during heating and cooling.

The ends of the parts may be of a shape that is conical or biconical, for example.

The invention also provides a metal part comprising a titanium portion and a steel portion, the part being characterized in that these two portions are assembled together by executing the diffusion welding method as described above, the ends of said portions being united via thin interposed layers of niobium or vanadium (beside the titanium) and of copper (beside the steel).

According to another characteristic of the invention, the titanium portion is a central portion having a steel portion assembled to each end thereof by the above-specified diffusion welding method.

This metal part may be solid or tubular.

The central portion of this part may be made of a composite material having a titanium matrix.

The metal part may constitute a turbine shaft for a turbomachine.

The invention also provides a turbomachine, such as a turbojet or a turboprop, characterized in that it includes a turbine shaft of the above-defined type.

BRIEF DESCRIPTION OF THE SEVERAL VIEWS OF THE DRAWINGS

The invention can be better understood and other characteristics, details, and advantages thereof appear more clearly on reading the following description made by way of example and with reference to the accompanying drawings, in which.

DETAILED DESCRIPTION OF THE INVENTION

Figure 1:
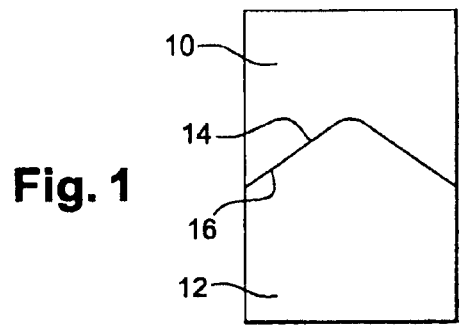
FIG. 1 is a diagrammatic section view showing the junction of the invention between a titanium part and a steel part.

FIG. 1 shows the assembly of a titanium part 10 with a steel part 12, the junction between these two parts being conical in shape and the end of the part 12 having an apex forming a rounded tip that is engaged in a cavity of complementary shape in the end of the part 10.

The interface between the two parts is formed by a thin layer or foil 14 of niobium or of vanadium, applied to the end of the titanium part 10, and a thin layer or foil 16 of copper applied to the end of the steel part 12.

These interposed foils 14, 16 are of thickness lying for example in the range 20 µm to 50 µm, approximately, and they may be formed by stamping plane disks.

In a variant, the interposed layers may be formed directly on the ends of the titanium and steel parts, by depositing metal using a known method, e.g. physical vapor deposition (PVD), chemical vapor deposition (CVD), or by electrolytic deposition.

Figure 2:
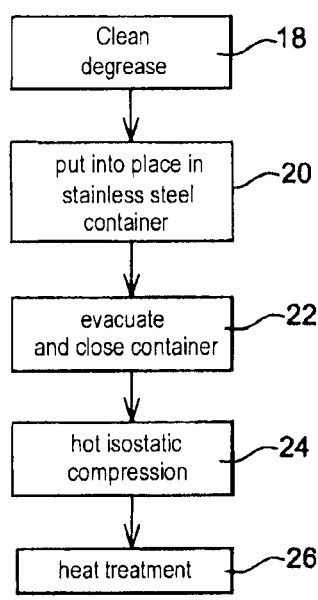
FIG. 2 is a flow chart showing the essential steps of the method of the invention.

The main steps of the method of the invention are shown diagrammatically in FIG. 2.

The parts for assembling are subjected in step 18 to careful cleaning and degreasing, and then in step 20 they are placed in a stainless steel container or case of known type suitable for subsequently applying hot isostatic compression to the parts it contains.

A secondary vacuum is created in step 22 inside the container for about twelve hours, and then the container is closed in leaktight manner by welding.

Thereafter, in a step 24, the container is placed in a hot isostatic compression enclosure where the assembly comprising the titanium part, the interposed metal layers, and the steel part is subjected to high temperature and pressure for a duration lying in the range one to three hours, approximately, the temperature lying in the range 900° C. to 950° C. and the pressure lying in the range 1000 bars to 1500 bars.

The assembly comprising the titanium part, the interposed metal layers, and the steel part is then subjected to heat treatment 26 in order to improve the qualities of the steel, the heat treatment typically comprising a dwell at high temperature, e.g. about 800° C., followed by controlled cooling, and another dwell at high temperature, e.g. about 450° C., followed by controlled cooling.

In a particular embodiment of the invention in which the part 10 is made of Ti6242 titanium alloy and the part 12 is made of M250 maraging steel, the duration of the hot isostatic compression is two hours with the pressure being 1400 bars and the temperature being 925° C.

The first cooling is performed at a rate of 4° C. to 5° C. per minute down to a temperature of about 400° C., and then the assembly constituted by the assembled parts 10 and 12 and the interposed metal layers is subjected to heat treatment including a dwell of two hours at a temperature of 790° C. and a dwell of two hours at a temperature of 455° C., with controlled cooling after the first dwell and at a cooling rate of about 4° C. to 5° C. per minute down to ambient temperature. The cooling after the dwell at 455° C. may be performed in air.

Preferably, the assembly comprising the two assembled-together parts remains subjected to the pressure of 1400 bars throughout the duration of the hot isostatic compression and the heat treatment of the steel.

Figure 3:
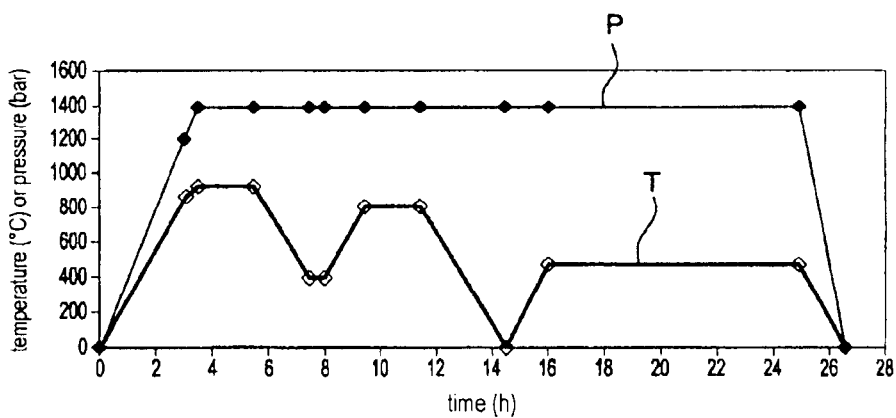
FIG. 3 is a graph plotting pressure and temperature curves during the hot isostatic compression and the heat treatment in the method of the invention.

The characteristics of hot isostatic compression and of the heat treatment of the steel are shown in FIG. 3, where curve P represents the variation in the pressure applied to the parts for assembling together, and the curve T represents variation in the temperature to which those parts are subjected, with time in hours being marked along the abscissa axis, and temperature in degrees C. and pressure in bars being marked up the ordinate axis.

At a hydrostatic pressure in the range 1000 bars to 1500 bars, the hot isostatic compression serves to pass through the cooling step of the heat treatment without damaging the interposed metals. Damage to a ductile metal such as copper is delayed under high hydrostatic pressure since such pressure inhibits the formation of defects and inhibits growth around such defects. This avoids the problems encountered in the prior art where the heat treatment of the steel gives rise to high levels of shear in the interposed metal layers by an effect of differential expansion under uniaxial pressure, and thus gives rise to destruction of the more ductile interposed metal.

Figure 4:
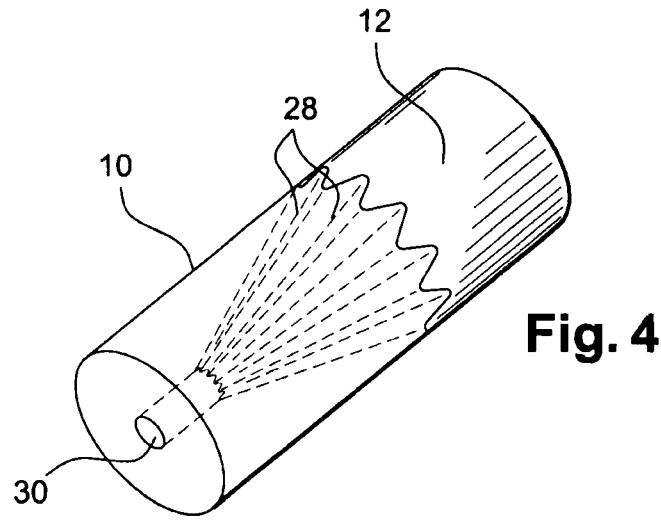
FIG. 4 is a diagrammatic perspective view of another junction shape between a titanium part and a steel part.

FIG. 4 is a diagram showing a variant embodiment for the shape of the junction between the titanium part 10 and the steel part 12. In this variant, the end of the steel part 12 includes a frustoconical tip with fluting 28 extending from the apex of the cone towards its base along generator lines of the cone. The two parts 10 and 12 are also formed with a central bore 30.

Figure 5:
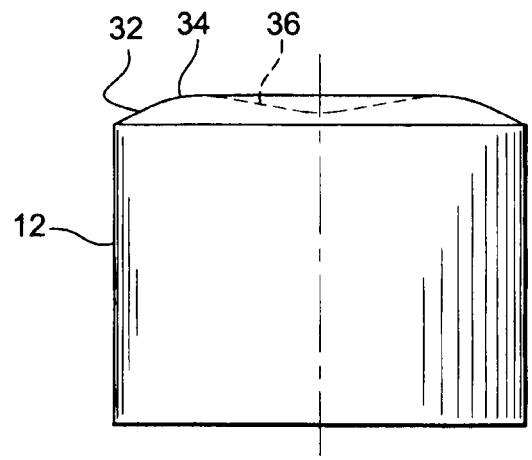
FIG. 5 is a diagrammatic section view of the end of a steel part in a variant of the invention.

Another embodiment of the junction between the two parts is shown diagrammatically in FIG. 5, for the steel part 12.

The end of this part that is for assembly to the end of the titanium part, is of a biconical shape and comprises a frustoconical surface 32 extending from the cylindrical periphery of the part 12 towards the axis of said part, and projecting from the part 12, this frustoconical surface being connected by a rounded convex edge 34 to a conical surface 36 that extends in the direction opposite to the first conical surface and that forms an indentation in the end of the part 12, this surface 36 extending from the rounded edge 34 to the central axis of the part 12.

The angle at the apex of the frustoconical surface 32 may be 120°, for example, while the angle at the apex of the conical surface 36 is about 160°.

The shape of the end of the titanium part 10 is complementary to the shape shown in FIG. 5.

Figure 6:
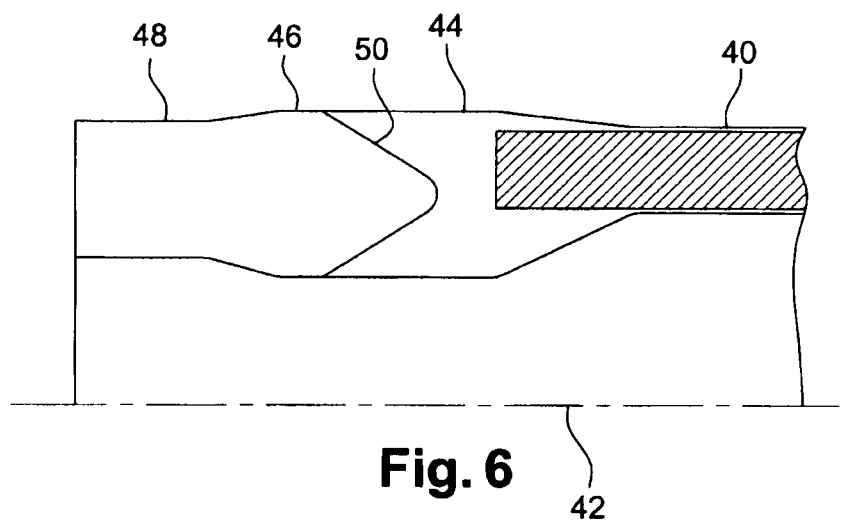
FIG. 6 is a diagrammatic half-view in axial section of an end portion of a turbine shaft of the invention.

FIG. 6 is a diagram showing a portion of a low-pressure turbine shaft of the invention, the shaft comprising a central portion 40 made of a composite material having a titanium matrix, said central portion being tubular about an axis 42 and being of greater thickness at its end 44 for connection to the corresponding end 46 of a tubular endpiece 48 of high strength steel that forms a link part linking to another component of a turbomachine such as an airplane turboprop or turbojet.

Making the endpiece 48 out of steel makes it possible to impart any appropriate shape thereto by machining, and its shape may be relatively complex.

The other end of the central portion 40 of the shaft (not shown) is also connected to an endpiece of the same type as that shown in FIG. 6.

The connections between the ends 44 of the central portion 40 and the endpieces 48 are made by performing the above-described diffusion welding method, using interposed niobium (or vanadium) and copper between the titanium and steel portions.

The junction 50 between each end of the central portion 40 and a respective endpiece 48 is of conical shape with a rounded apex forming a circular arc directed towards the central portion 40.

In an embodiment, the circular arc at the apex of the junction has a radius greater than 20 millimeters (mm) and the angle at the apex is about 60°.

In a particular embodiment of the invention, the central portion 40 of the low-pressure turbine shaft has an outside diameter of 81 mm and is made of a composite material having a Ti6242 matrix and long SiC fibers, and the endpieces 48 are made of an M250 maraging steel. The junctions at the ends of the central portion 40 with the endpieces 48 are capable of transmitting a torque corresponding to the loss of a blade, i.e. about 70,000 newton-meters (Nm). Furthermore, these junctions are capable of withstanding 25,000 takeoffs without cracks appearing, with the torque transmitted during such takeoffs being of the order of 41,500 Nm (where takeoff is the stage of flight during which the transmitted torque is at a maximum under normal conditions of use).

The invention claimed is:

1. A method of assembling together titanium parts and steel parts by diffusion welding, the method comprising:
   - interposing two thin metal layers between a titanium part and a steel part, the two metal layers comprising a thin layer or foil of niobium or vanadium in addition to the titanium and a thin layer or foil of copper in addition to the steel;
   - putting an assembly comprising the two parts and the two interposed metal layers under a vacuum;
   - subjecting the assembly to hot isostatic compression at a temperature lying in a range 900° C. to 950° C., and at a pressure lying in a range 1000 bars to 1500 bars, the hot isostatic compression being followed by controlled cooling; and
   - subsequently subjecting the assembly to heat treatment during which the assembly is maintained at a pressure in a range 1000 bars to 1500 bars.

2. A method according to claim 1, wherein a duration of the hot isostatic compression lies in a range one hour to three hours, approximately.

3. A method according to claim 1, the heat treatment includes a first dwell at about 800° C., followed by cooling, a second dwell at about 450° C., and cooling.

4. A method according to claim 1, wherein the interposed metals present a thickness lying in a range about 20 μm to about 50 μm.

5. A method according to claim 1, further comprising machining ends of the parts for assembling together to give the ends of the parts non-plane complementary shapes, the end of the steel part including at least one projecting portion engaged in an indentation in the titanium part.

6. A method according to claim 5, further comprising giving a conical or a biconical shape to the ends of the parts.

7. A method according to claim 1, wherein the interposed metals are formed by depositing metal on the ends of the parts that are to be assembled.

8. A method according to claim 1, further comprising stamping the interposed metals to give the interposed metals a shape corresponding to the shape of the ends of the parts.

9. A method according to claim 1, wherein the putting the assembly under the vacuum includes placing the assembly inside a container suitable for hot isostatic compression, creating the vacuum inside the container, and closing the container such that the container is leaktight, and
   wherein the subjecting the assembly to hot isostatic compression includes placing the container in a hot isostatic compression enclosure.

10. A method according to claim 9, wherein the container is closed by welding.

11. A method according to claim 9, wherein the container is a stainless steel container.

12. A method according to claim 9, wherein the vacuum is created inside the container for approximately twelve hours.

* * * * *